United States Patent
Bonnardel et al.

(10) Patent No.: US 11,808,032 B2
(45) Date of Patent: *Nov. 7, 2023

(54) COMPOSITE INSULATION INCLUDING AN INORGANIC AEROGEL AND A MELAMINE FOAM

(71) Applicant: Aspen Aerogels, Inc., Northborough, MA (US)

(72) Inventors: Pierre-Antoine Bonnardel, Gif-sur-Yvette (FR); Sophie Chausson, Villeurbanne (FR); Emilie Gerardin, Bourgoin-Jallieu (FR)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,159

(22) Filed: May 3, 2022

(65) Prior Publication Data
US 2022/0259850 A1    Aug. 18, 2022

Related U.S. Application Data

(63) Continuation of application No. 14/897,982, filed as application No. PCT/EP2014/062437 on Jun. 13, 2014.

(30) Foreign Application Priority Data

Jun. 14, 2013   (FR) ...................................... 1355558

(51) Int. Cl.
*E04B 1/80*    (2006.01)
*E04B 1/86*    (2006.01)
(Continued)

(52) U.S. Cl.
CPC ............ *E04B 1/80* (2013.01); *B01J 13/0091* (2013.01); *C04B 26/125* (2013.01);
(Continued)

(58) Field of Classification Search
CPC ..................................... E04B 1/80; E04B 1/86
(Continued)

(56) References Cited

U.S. PATENT DOCUMENTS 2,188,007 A    1/1940   Kistler
4,363,738 A    12/1982  Kummermehr
(Continued)

FOREIGN PATENT DOCUMENTS

CN    1196036 A       10/1998
CN    102583407 A     7/2012
(Continued)

OTHER PUBLICATIONS

Basotect G—Technical Information. Nov. 1, 2006.
(Continued)

*Primary Examiner* — Tahseen Khan
(74) *Attorney, Agent, or Firm* — WOMBLE BOND DICKINSON (US) LLP; Deborah M. Vernon; Dennis J. Parad (57) ABSTRACT

The invention relates to insulating composite materials comprising an inorganic aerogel and a melamine foam. The invention also relates to the product method of said materials, and to the use of same.

17 Claims, 3 Drawing Sheets

(51) Int. Cl.
*C04B 28/00* (2006.01)
*B01J 13/00* (2006.01)
*C04B 26/12* (2006.01)
*C04B 38/00* (2006.01)
*C08J 9/40* (2006.01)
*E04B 1/74* (2006.01)

(52) U.S. Cl.
CPC ........ *C04B 28/005* (2013.01); *C04B 38/0045* (2013.01); *C08J 9/40* (2013.01); *E04B 1/86* (2013.01); *C04B 2201/32* (2013.01); *C08J 2201/038* (2013.01); *C08J 2361/28* (2013.01); *E04B 2001/742* (2013.01); *Y02A 30/24* (2018.01); *Y02B 80/10* (2013.01)

(58) Field of Classification Search
USPC ....................................................... 428/220
See application file for complete search history.

(56) References Cited

U.S. PATENT DOCUMENTS

| | | | |
|---|---|---|---|
| 4,447,345 A | 5/1984 | Kummermehr et al. | |
| 4,619,908 A | 10/1986 | Cheng et al. | |
| 4,667,417 A | 5/1987 | Graser et al. | |
| 4,717,708 A | 1/1988 | Cheng et al. | |
| 4,904,328 A | 2/1990 | Beecher et al. | |
| 4,966,919 A | 10/1990 | Williams, Jr. et al. | |
| 5,037,859 A | 8/1991 | Williams, Jr. et al. | |
| 5,124,101 A | 6/1992 | Hirao et al. | |
| 5,124,364 A | 6/1992 | Wolff et al. | |
| 5,137,927 A | 8/1992 | Wolff et al. | |
| 5,275,796 A | 1/1994 | Tillotson et al. | |
| 5,306,555 A | 4/1994 | Ramamurthi et al. | |
| 5,565,142 A | 10/1996 | Deshpande et al. | |
| 5,569,513 A | 10/1996 | Fidler et al. | |
| 5,691,392 A | 11/1997 | Okoroafor et al. | |
| 5,786,059 A | 7/1998 | Frank et al. | |
| 5,789,075 A | 8/1998 | Frank et al. | |
| 5,830,387 A | 11/1998 | Yokogawa et al. | |
| 5,866,027 A | 2/1999 | Frank et al. | |
| 5,962,539 A | 10/1999 | Perrut et al. | |
| 5,972,254 A | 10/1999 | Sander | |
| 5,973,015 A | 10/1999 | Coronado et al. | |
| 6,040,375 A | 3/2000 | Behme et al. | |
| 6,068,882 A | 5/2000 | Ryu | |
| 6,080,219 A | 6/2000 | Jha et al. | |
| 6,080,475 A | 6/2000 | Frank et al. | |
| 6,083,619 A | 7/2000 | Frank et al. | |
| 6,087,407 A | 7/2000 | Coronado et al. | |
| 6,121,336 A | 9/2000 | Okoroafor et al. | |
| 6,136,216 A | 10/2000 | Fidler et al. | |
| 6,140,377 A | 10/2000 | Schwertfeger et al. | |
| 6,187,250 B1 | 2/2001 | Champagne | |
| 6,197,270 B1 | 3/2001 | Sonoda et al. | |
| 6,479,416 B1 | 11/2002 | Frank et al. | |
| 6,620,355 B1 | 9/2003 | Schmidt | |
| 6,656,527 B1 | 12/2003 | Gessner et al. | |
| 6,670,402 B1 | 12/2003 | Lee et al. | |
| 6,719,947 B1 | 4/2004 | Jha et al. | |
| 6,770,584 B2 | 8/2004 | Barney et al. | |
| 6,887,563 B2 | 5/2005 | Frank et al. | |
| 6,989,123 B2 | 1/2006 | Lee et al. | |
| 7,078,359 B2 | 7/2006 | Stepanian et al. | |
| 7,101,607 B2 | 9/2006 | Mollendorf et al. | |
| 7,112,234 B2 | 9/2006 | Jha et al. | |
| 7,399,439 B2 | 7/2008 | Lee et al. | |
| 7,504,346 B2 | 3/2009 | Stepanian et al. | |
| 7,780,890 B2 | 8/2010 | Lee et al. | |
| 7,781,492 B2 | 8/2010 | Williams et al. | |
| 7,816,413 B2 | 10/2010 | Feaver et al. | |
| 7,977,411 B2 | 7/2011 | Williams et al. | |
| 8,105,512 B1 | 1/2012 | Lucas et al. | |
| 8,214,980 B2 | 7/2012 | Bullock et al. | |
| 8,691,883 B2 | 4/2014 | Cho et al. | |
| 8,937,106 B2 | 1/2015 | Steinke et al. | |
| 9,199,394 B2 | 12/2015 | Brown et al. | |
| 9,605,427 B2 | 3/2017 | Besselievre et al. | |
| 2002/0094426 A1 | 7/2002 | Stepanian et al. | |
| 2005/0046086 A1 | 3/2005 | Lee et al. | |
| 2005/0100728 A1 | 5/2005 | Ristic-Lehmann et al. | |
| 2007/0152363 A1 | 7/2007 | Begag et al. | |
| 2007/0190427 A1* | 8/2007 | Carlson ................ C04B 14/303 429/251 |
| 2007/0259979 A1 | 11/2007 | Lee | |
| 2008/0229704 A1 | 9/2008 | Augustyniak et al. | |
| 2008/0287561 A1 | 11/2008 | Menashi et al. | |
| 2009/0029147 A1* | 1/2009 | Tang .................... C08J 9/0066 521/142 |
| 2010/0089551 A1 | 4/2010 | Quadbeck-Seeger et al. | |
| 2012/0064287 A1 | 3/2012 | Park et al. | |
| 2012/0094062 A1 | 4/2012 | Park et al. | |
| 2012/0097907 A1 | 4/2012 | Bauer et al. | |
| 2012/0112117 A1 | 5/2012 | Vo et al. | |
| 2012/0142240 A1 | 6/2012 | Eling et al. | |
| 2012/0142802 A1* | 6/2012 | Steinke ................. C08J 9/0014 521/187 |
| 2012/0142804 A1 | 6/2012 | Blackwell | |
| 2013/0337255 A1 | 12/2013 | Steinke et al. | |
| 2014/0044929 A1 | 2/2014 | Evans et al. | |
| 2014/0128488 A1 | 5/2014 | Lotti et al. | |

FOREIGN PATENT DOCUMENTS

| | | |
|---|---|---|
| DE | 19533564 A1 | 3/1997 |
| DE | 102010033379 A1 | 2/2012 |
| EP | 0340707 A2 | 11/1989 |
| EP | 0667370 A2 | 8/1995 |
| EP | 1808454 A2 | 7/2007 |
| EP | 2397513 A2 | 12/2011 |
| JP | H07316328 A | 12/1995 |
| JP | 2002059443 A | 2/2002 |
| JP | 2002275305 A | 9/2002 |
| JP | 2004306571 A | 11/2004 |
| JP | 2010047710 A | 3/2010 |
| JP | 2010525188 A | 7/2010 |
| WO | 200194436 A2 | 12/2001 |
| WO | 2008051029 A1 | 5/2008 |
| WO | 2012076492 A1 | 6/2012 |
| WO | 2012113740 A2 | 8/2012 |
| WO | 2013053951 A1 | 4/2013 |
| WO | 2014198931 A1 | 12/2014 |

OTHER PUBLICATIONS

Berge et al. "Chalmers: Literature review of High Performance Thermal Insulation." Jan. 1, 2012.
Felix et al., "A thermal porosimetry method to estimate pore size distribution in highly porous insulating materials", May 1, 2012.
Fricke et al., "Optimization of monolithic silica aerogel insulants", international journal of heat and mass transfer, Sep. 1, 1992, pp. 2305-2309.
Lu et al. "Thermal COnductivity of Monolithic Organic Aerogels" Science. 255(1992): 971-972.
Vorobiev. "Polymeric thermal insulating materials." Publishing house for the books on construcctionw orks. Moscow, 1972, p. 54, p. 57, last paragraph.

* cited by examiner

COMPOSITE INSULATION INCLUDING AN INORGANIC AEROGEL AND A MELAMINE FOAM

The present invention relates to insulating composite materials comprising an inorganic aerogel and a melamine foam, a process for their manufacture, and their uses.

Energy conservation, particularly with thermal insulation, is an important issue in industry and building construction.

Traditional thermal insulation includes the use of glass wool, rock, extruded polystyrene or expanded polystyrene, often used in combination in industrial insulation systems or building construction. For building construction, the insulation may be glued to plaster board.

The thermal insulation performance of insulation materials is measured by their thermal conductivity. The lower the value of the thermal conductivity, the less the material conducts heat and the better the thermal insulation is. In the present invention, the thermal conductivity is measured by means of guarded hot plate according to NF EN 12667 standards (as of July 2001) at 20° C. and atmospheric pressure.

However, manufacturers are looking for ever more efficient and more economical insulation materials.

It is in this context that insulation based on aerogels and xerogels has been developed.

A gel has a continuous three-dimensional porous structure. Preparation of the gel involves a sol-gel transition step, that is to say the transition of a suspension of solid particles (sol), to a gelatinous solid (gel).

Gels are distinguished according to the nature of the fluid present in the pores of the gel, xerogels and aerogels (air), hydrogels (water), organogels (organic solvent), and in particular the alcogels (alcohol). Hydrogels, alcogels and organogels are also gathered under the more general term, lyogels.

Traditionally, the term aerogel refers generally to a gel dried under supercritical conditions, that is to say that the majority of the solvent is in the supercritical fluid state under these conditions; whereas the term xerogel refers to a gel dried under subcritical conditions, that is to say that the majority of the solvent is not in the supercritical fluid state under these conditions. Both aerogels and xerogels are very interesting not only for their excellence in thermal insulation and acoustics, but also for their low density.

However, for simplification purposes, the term "aerogel" includes both aerogels and xerogels.

Aerogels are typically obtained in granular form, which poses problems in transportation and handling. Several solutions have thus emerged to obtain "monolithic" (reinforced) aerogels.

Within the context of the present invention, the term "monolithic" is understood as a material or aerogel which is solid and is in the form of a single block piece, particularly in the form of a panel. The monolithic aerogel material can be flexible or rigid. The term "rigid" is meant that the material cannot be significantly deformed without observing the formation of cracks or rupture in the monolithic material. In particular, this means that the monolithic material cannot be rolled. The term "flexible" is meant that the material can be deformed, in particular wound. The term "self-supporting" can also be used to qualify monolithic material in which the product stability is not due to an external support. A self-supporting monolithic material can be flexible as well as rigid.

It is further advantageous, particularly for applications in building construction, to obtain a thickness of insulating material, for example greater than 2 cm, especially around 5 cm. The new standards for insulation inside buildings (2012 French Thermal Regulations) advocate the use of panels whose thermal resistance is R=3 $m^2$ K/W.

Another problem related to the use of aerogels, and particularly granular aerogels is their dusting character; that is to say they release dust, silica in the case of silica aerogels for example.

A first category of "monolithic" (reinforced) materials which overcomes some of these problems is obtained by adding a binder to a particulate aerogel. Aerogels particles are thus "glued" together. The use of foams as a binder is one general way of improving thermal performance of the material used. This is what has been described in US 2012/0142802, EP 1808454, EP 0340707 and DE 19533564, in which the binder is a melamine foam.

A process for preparing this type of monolithic composite material consists of mixing the aerogel particles in a pre-formed mixture of melamine foam precursors, and carrying out a polymerization reaction and formation of the foam. The materials obtained according to such a method, however, have average thermal insulation performance (thermal conductivity in general between 25 and 40 mW/m-K). In particular, document US 2012/0142802 teaches the use of a foam having a pore size between 10 and 1000 µM, and an aerogel with a pore size less than 50 nm and a porosity of between 50 and 99% as starting materials, but does not specify the corresponding characteristics of composite materials obtained. EP 1808454, EP 0340707 and DE 19533564 also do not specify these characteristics.

Meanwhile, the documents US 2007/0259979, US 2009/0029147 and U.S. Pat. No. 6,040,375 disclose composites comprising an open cell foam, in particular polyurethane foam combined with a silica aerogel, obtainable by casting a silica sol in a preformed polyurethane foam panel, followed by gelling, and drying. The resulting materials have a thermal conductivity of between 18 and 22 mW/m-K. The document US 2009/0029147 seems to teach that the obtained aerogel has a porosity of at least 95%. Other documents do not seem to characterize the pore diameter or porosity of the materials.

Thus, the skilled person is not inclined to develop a composite material based aerogel and melamine foam, since melamine foam, according to the disclosures of the prior art, appear to be not very efficient in terms of thermal insulation, particularly compared with other polyurethane-based foam materials. It is further discouraging that the thermal conductivity of melamine foams, including foams Basotect marketed by BASF, is about 35 mW/m-K, while the thermal conductivity open cell polyurethane foams is generally between 20 and 25 mW/m-K.

Surprisingly, the applicant has made composite insulating materials comprising an inorganic aerogel and an open-cell melamine foam having good thermal insulation performance which are easy to handle, and have greatly decreased (even eliminated) dusting character. The foam does not play the role of binder in these composites.

Within the context of the present invention, the term "composite material" is understood as a material comprising at least two immiscible compounds intimately related. The composite material has properties, including physical (e.g. thermal conductivity, stiffness, etc), that each of the materials taken separately do not necessarily have.

Within the context of the present invention, the term "foam" is understood as substance, including a polymer, trapping gas bubbles in it. Foams can be a "closed cell foam", that is to say that a majority of the gas pockets are completely enclosed with the solid material, as opposed to "open cell foams", wherein a majority of the gas pockets are open to each other. For example, foam marketed under the name of Basotect® are open cell foams.

Within the context of the present invention, the term "melamine foam" is a foam comprising a polymer whose monomer is a melamine. An example of melamine foam is a melamine-formaldehyde foam, from a polymerization reaction between melamine and formaldehyde.

Without being bound to this specific interpretation, it seems that the properties of the composite material according to the invention, and especially the low thermal conductivity, are intrinsically linked to the macroporosity of the material. Thus, the remarkable thermal performance of materials according to the invention are the result of the control of the macroporosity of the material and/or diameter of the macropores. The presence of macropores effects the overall thermal conductivity by generating a contribution to conductivity by significant gas convection. Minimization of the proportional volume of macropores with respect to total volume can produce remarkable thermal performance.

Within the context of the present invention, the term "macropore" is understood as a pores with a diameter greater than 10 µm. Indeed, as Knudsen formalism quantifies, the thermal conductivity of the air depending on the characteristic confinement dimension (eg pore size), $\lambda$ increases according to the following law:

$$\lambda_{g0} = \frac{\lambda_0}{1 + \alpha K_n},$$

wherein $\lambda_0$ the conductivity of free gas (ie unconfined) is the accommodation coefficient between the gas and the solid (coefficient reflecting the quality of heat exchange between the gas and the confining solid); Kn, the Knudsen factor, defined as the ratio between the free mean path of the gas and the characteristic dimension of the containment (eg pore size). Thus, over a macropore size of 10 µm, air is no longer confined, which negatively influences the thermal conductivity properties.

Within the context of the present invention, the term "total macropore" is the total number of pores with a diameter greater than 10 µm.

Within the context of the present invention, the term "macroporosity" of a porous material is the ratio of the volume occupied by the macropores in the volume occupied by the material in its entirety. The macroporosity is expressed in percentage (%) and measured by three dimensional (3D) X-ray tomography. Preferably, X-ray tomography acquisitions are made using the DeskTom machine model with a 130 kV generator. The distance from source to sample is about 12 cm. The software used for the acquisition and reconstruction of the data is the X-Act program developed by RX Solutions. For post-processing (visualization and analysis of porosity), the software VG Studio Max Version 2.2 was used. The settings can be established according to the general knowledge of a skilled person.

Within the context of the present invention, the term "diameter" can describe the pores of a porous material, with the diameter determined by a statistical extrapolation of the macropore volume distribution of the porous material, for example as measured by three dimensional (3D) X-ray tomography. It is believed that the pores are in the shape of a sphere. The relationship between the diameter of the macropores and the volume of the material is as follows: $V=(pi \times D^3)/6$, with V as the volume and D as the diameter of the sphere. One example of determining the pore diameter for materials of the present invention is presented in Example 1.

An object of the present invention is to provide a monolithic composite material comprising an inorganic aerogel and a melamine foam with open cells, said material having a thermal conductivity $\lambda$ between 5 and 20 mW/m-K, measured according to the guarded hot plate method of the standard NF EN 12667 at 20° C. and atmospheric pressure, and having a macroporosity of less than 5%, preferably less than 2%.

Another object of the invention relates to a method of manufacturing a monolithic composite material comprising an inorganic aerogel and an open-cell melamine foam according to the invention, comprising the following successive steps: a) casting an inorganic sol in a reactor in which a preformed open-cell melamine foam has been placed beforehand, b) gelation of the sol into a lyogel, c) drying the lyogel.

Another object of the invention relates to a monolithic composite material comprising an inorganic aerogel and a melamine foam, said material having a thermal conductivity $\lambda$, between 5 and 20 mW/m-K measured according to the guarded hot plate method of the NF EN 12667 at 20° C. and atmospheric pressure, and obtainable by a method according to the invention.

Another object of the invention relates to a multilayer panel comprising at least one layer consisting essentially of a composite material according to the invention.

Another object of the invention relates to the use of a monolithic composite material comprising an inorganic aerogel and an open-cell melamine foam, or a multilayer panel according to the invention, as thermal or acoustic insulator.

Composite Material

The present invention relates to a monolithic composite material comprising or consisting essentially of an inorganic aerogel reinforced by a pre-formed open-cell melamine foam, said material having a thermal conductivity $\lambda$, between 5 and 20 mW/m-K, preferably between 10 and 20 mW/m-K, advantageously between 10 and 15 mW/m-K, measured according to the method of the guarded hot plate of the standard NF EN 12667 at 20° C. and atmospheric pressure, and having a macroporosity of less than 5%, preferably less than 2%.

In the context of the present invention, the term "consisting essentially of" is meant that the material may include other elements than those mentioned, but sufficiently small quantities that they do not alter the essential characteristics of the material. Thus, the material may contain impurities, including trace impurities.

The monolithic composite material of the invention is monolayer. The material is also observed to be homogeneous, especially in terms of structure, thermal conductivity, macroporosity and flexibility.

Melamine foam improves certain mechanical properties of the aerogel, while maintaining a thermal conductivity less than 20 mW/m-K measured by means of guarded hot plate of NF EN 12667 at 20° C. and atmospheric pressure. For example, the maximum stress in elastic phase of the composites is much larger than that of the corresponding non-reinforced aerogel. Typical values are 3.5 MPa respectively (for the composite material) and $1.10^{-4}$ MPa (for the corresponding non-reinforced aerogel).

Within the context of the present invention, the term "preformed foam" is meant that the open-cell melamine foam no longer undergoes chemical reaction changing the melamine polymer structure, including chemical polymerization reaction or crosslinking. Moreover, the macroporosity of the foam is not changed by a physical reaction. The only alteration that the foam is subject to is the formation of the gel within its open cells. The shape of the resulting composite material will be essentially identical to that of the preformed foam.

Advantageously, the thermal conductivity measured by means of guarded hot plate of the NF EN 12667 at 20° C. and at atmospheric pressure is between 5 and 20 mW/m-K, even more preferably between 8 and 15 mW/m-K.

It is found experimentally that the material of the invention has pores whose diameter is between 50 and 250 µm.

Preferably, macropores having a diameter between 50 and 250 microns comprise more than 80% (by number) of the total number of macropores (pores having a diameter greater than or equal to 10 µm) of the material according to the invention.

Preferably, the open-cell melamine foam is melamine-formaldehyde. One example of a melamine-formaldehyde foam is Basotect foam marketed by BASF. In a particular embodiment, the melamine-formaldehyde foam has a thickness between 2 and 50 mm, a porosity of between 95% and 99.5%, a density between 8.5 and 11.5 kg/m$^3$ and a thermal conductivity between 35 and 40 mW/m-K measured by means of guarded hot plate of NF EN 12667 at 20° C. and atmospheric pressure.

The melamine foam provides structure the aerogel to improve its mechanical strength properties and resistance, while retaining its thermal insulation properties.

Advantageously, the composite material of the invention has a density between 70 kg/m$^3$ and 150 kg/m$^3$, preferably between 100 and 120 kg/m$^3$.

Preferably, the composite material according to the invention comprises between 85% and 98% by weight aerogel based on the weight of the composite material, preferably between 90% and 95%, between 92% and 98%, or between 92 and 95% by weight aerogel based on the total weight of the composite.

Advantageously, the inorganic aerogel is selected from silica aerogels, titanium oxide, manganese oxide, calcium oxide, calcium carbonate, zirconium oxide, or mixtures thereof, preferably from silica aerogels.

In an one advantageous embodiment, the composite material according to the invention has a thickness between 2 and 50 mm, preferably between 5 and 30 mm, for example between 10 and 20 mm. It is observed that the thickness of the monolithic composite material is correlated with the thickness of the melamine foam used. Thus, the melamine foam preferably has a thickness between 2 and 50 mm, preferably between 5 and 30 mm, for example between 10 and 20 mm.

The aerogel may further include an additive. Advantageously, the additive is intended to improve the mechanical properties, cohesion, or thermal conductivity of monolithic composite materials according to the invention. Preferably, the additive comprises an opacifier. Thus, advantageously, the material of the invention further comprises an opacifier. The use of an opacifier makes it possible to decrease the value of the thermal conductivity by reducing its radiative component. Typically, the opacifier is selected from SiC, $TiO_2$, carbon black, graphite, $ZrO_2$, ZnO, $SnO_2$, MnO, NiO, TiC, WC, $ZrSiO_4$, $Fe_2O_3$, $Fe_3O_4$, $FeTiO_3$. In particular, the opacifier is selected from the group consisting of SiC and $TiO_2$.

In a preferred embodiment, the composite material according to the invention comprises no binder. Examples of inorganic binders include cements, plasters, gypsum, lime; and examples of organic binders include thermoplastic polyolefins such as waxes, styrene polymers, polyamides. The term "binder" also includes adhesives, such as epoxy resins and cyanoacrylates, for example.

In a preferred embodiment, the composite material of the invention does not comprise a fibrous reinforcing material. For the purposes of the present invention, a "fibrous reinforcing material" includes fibers or a nonwoven fibrous web, or a mixture thereof. The various types of fibers adapted for the manufacture of thermal insulation are known to those skilled in the art. Examples include glass fibers, mineral fibers, polyester fibers, aramid fibers, nylon fibers and vegetable fibers, or a mixture thereof, as described in U.S. Pat. No. 6,887,563.

Advantageously, the composite material according to the invention is hydrophobic, vapor permeable, and stable at temperatures up to 250° C. It cuts easily and has minimal dust compared to other composite materials based on silica aerogel. In addition, composites of the invention are lightweight and flexible. They also exhibit good acoustic insulation properties. The materials according to the invention have good fire resistance properties, they are preferably classified at least B1 according to German DIN 4102-1, M1 in France according to the NF P-92507 or V0 according to the United States UL94. The combustion energy or gross calorific value of the composite material according to the invention measured according to standard NF EN ISO 1716 is preferably lower than most performance insulating materials such as polyurethane.

The material according to the invention is obtainable by the process comprising the following successive steps: a) casting an inorganic sol in a reactor in which was first placed a preformed open-cell melamine foam, b) gelation of the sol into a lyogel, c) drying the lyogel under subcritical conditions.

A method for obtaining materials according to the invention is described in more detail hereinafter.

In the present invention, the quantity of residual solvent by weight of the monolithic composite material is calculated according to EN/ISO 3251. The protocol used involves taking 1 g of aerogel according to the invention, weighing, and then drying for 3 hours in an oven at 105° C., then weighing the dried aerogel.

The composite material according to the invention typically has a quantity of residual solvent by weight of the composite material less than or equal to 3%, preferably less than 1% in accordance with EN/ISO 3251.

Multilayer Boards

The present invention also relates to multi-layer panels, in particular in the form of multilayer laminates or sandwich panels comprising at least one layer consisting essentially of a monolithic composite material of the invention, optionally in combination with layers of different materials.

In the multilayer panel according to the invention, each layer is made of a monolithic material or a panel adhered to one or more other layers. For example, one or more plasterboard (optionally type BAI13) may be bonded to one or each side of a monolithic composite material of the invention to form a wall covering. Also contemplated are multilayer composite panels comprising a combination of one or more composite materials according to the invention and a composite material as described for example in international application WO 2013/053951.

The composite material according to the present invention provides a multilayered panel with improved characteristics suitable for special applications. For example, a monolithic composite material of the invention laminated to a rigid insulation panel according to application WO 2013/053951 provides a compressive elasticity or acoustic damping superior to the individual material. The layer made of the monolithic composite material of the invention can also act as a firewall or flame retardant or high temperature insulation layer relative to the material which it is associated.

Laminating a composite layer of thermoformable material between two layers of the multilayer panel can confer the laminate an ability to be thermorformed itself.

Process for Obtaining

The present invention also relates to a method for producing a monolithic composite material comprising or consisting essentially of an inorganic aerogel reinforced by a pre-formed open-cell melamine foam having a thermal conductivity $\lambda$, between 5 and 20 mW/m-K measured by means of guarded hot plate of the standard NF EN 12667 at 20° C. and atmospheric pressure, and having a macroporosity of less than 5%, preferably below 2%, comprising the following successive steps: a) casting an inorganic sol in a reactor in which was first placed a preformed open-cell melamine foam, b) gelation of the sol into a lyogel, c) drying the lyogel.

The drying in step c) is preferably carried out so that the obtained aerogel has a quantity of residual solvent by weight of the composite material of less than or equal to 3%, preferably 1%, in accordance with EN/ISO 3251. Advantageously, the drying step c) takes place under subcritical conditions.

Advantageously, binder, in particular as defined above, is not used or added in any step of the process according to the invention. Furthermore, preferably no fibrous reinforcing material, as defined above, is employed in the process according to the invention.

Preferably, the sol used in step a) is selected from the group of silica sols, titanium oxide, manganese oxide, calcium oxide, calcium carbonate, zirconium oxide or mixtures thereof. Preferably, the sol is a silica sol. Thus, step a) preferably comprises the casting of a silica sol in a reactor in which was first placed a preformed open-cell melamine foam.

An additive may be added to the sol in step a), preferably an additive comprising an opacifier. The additive and the opacifier are as defined above.

The lyogel obtained in step b) preferably comprises from 70 to 90% by weight of solvent, preferably from 75% to 85% by weight solvent, based on the starting weight of soil.

Particular Embodiments: Step b)

In one embodiment, the lyogel is an alcogel. In this case, the solvent is preferably ethanol. In this embodiment, step b) is advantageously followed by a step b2) aging the alcogel followed by a step b3) hydrophobizing treatment of the alcogel, after which a hydrophobic alcogel is obtained. Step b2) includes, for example contacting the alcogel obtained in step b1) with a hydrophobizing agent in acid medium of pH of between 1 and 3. Advantageously, the hydrophobizing agent used is selected from the group of organo-siloxanes, organo-chlorosilanes or organo-alkoxysilanes, more advantageously, the hydrophobizing agent used is selected from the group consisting of hexamethyl-disiloxane (HMDSO), trimethyl-chlorosilane and trimethyl-ethoxysilane, even more advantageous hexamethyl-disiloxane (HMDSO). In addition, in this embodiment, the silica sol according to the invention is preferably obtained by controlled hydrolysis of tetraethoxysilane in ethanol. Advantageously, the ethanol generated during the hydrolysis is recycled and reused as solvent the same step subsequently. Preferably, step b3) comprises contacting the alcogel obtained in step c) with a hydrophobizing agent in acid medium of pH of between 1 and 3.

Advantageously, the alcogel is acidified in step b3) by addition of a mineral or organic acid. More desirably, the inorganic acid is hydrochloric acid and the organic acid is trifluoroacetic acid. Even more advantageously, the acid is trifluoroacetic acid or hydrochloric acid, and hydrophobing agent hexamethyldisiloxane (HMDSO). Advantageously, step b3) is conducted at a temperature between 50° C. and 150° C. Even more preferably, step b3) is conducted at the alcohol boiling temperature (solvent of the alcogel). In the case where the solvent is ethanol, step b3) is carried out under reflux of ethanol.

In another embodiment, the lyogel obtained at the end of step a) is a hydrogel. In this case, step b) is advantageously followed by a step b2) exchange of the solvent (water) with an organic solvent such as acetone, hexane or heptane leading to the formation of a lyogel, the step optionally preceded by a step of aging the hydrogel, and followed by a step b3) hydrophobizing treatment of the lyogel, after which a hydrophobized lyogel is obtained. In cases where the lyogel is a hydrogel, The implementation conditions of step b3) hydrophobizing treatment of the lyogel are similar to those described above (in particular temperature, reactants, etc.) near the solvent.

In the previous embodiments, the aging step improves mechanical properties of the lyogel due to the effects of syneresis (separation of the liquid and the gel). This aging step preferably has a duration of less than 24 hours. Conditions such as temperature and aging time can be set according to criteria known to those skilled in the art such as, for example, the composition of the gel.

Advantageously, the aging step is conducted at a temperature between 40° C. and 80° C., even more preferably at a temperature between 45° C. and 60° C. Advantageously, the aging step has a duration less than 20 h.

In the previous embodiments, the hydrophibic treatment in step b3) of the process allows for reduction of the water uptake of the composite material. The composite material according to the invention preferably has a water uptake rate at room temperature and 75% relative humidity of less than 5%, more preferably less than 3% and preferably a water recovery ratio at room temperature and 95% of less than 10%, even more preferably less than 5%.

Particular Embodiments: Step c)

In one embodiment, step c) is divided into a step c1) of pre-curing in subcritical conditions at a temperature below 80° C., and a step c2) of drying under subcritical conditions, said drying step c2) being dielectric or convective, at a temperature above 100° C. when said drying c2) is convective.

In one embodiment, step c2) is a convective drying, performed at a temperature between 120° C. and 180° C., preferably between 140° C. and 160° C., even more preferably equal to about 150° C. The convective drying can be conducted in a natural fashion, but is preferably carried out in forced convection mode.

In another embodiment, step c2) is a dielectric drying step by microwaves.

Preferably, the pre-drying step c1) is continued until a condensed lyogel is formed, having lost between 10 and 80% alcohol by weight, preferably between 20% and 60% by weight of alcohol, even more preferably between 40% and 50% by weight alcohol based on the weight of the starting materials.

Advantageously, the pre-drying temperature in step c1) is between 40° C. and 80° C., even more preferably between 60° C. and 80° C., even more preferably equal to about 80° C.

In a preferred embodiment of the invention, the step c1) is performed by circulating a hot gas stream in the reactor. The gas stream is typically a flow of inert gas such as nitrogen, air or a noble gas. Advantageously, the hot gas stream flows vertically, even more preferably from top to bottom.

In another embodiment, the pre-drying in step c1) is conducted under reduced pressure. Such an embodiment is advantageous because it allows for shorter pre-drying times at the same temperature.

Advantageously, step c2) is performed by convective drying by circulating a stream of hot air into the dryer. At the laboratory scale, the convective drying is preferably carried out in an oven at a temperature of 150° C.

In another embodiment, step c2) is carried out by dielectric drying by microwaves. Preferably, the power supplied in the microwave drying step is between 0.3 kW and 3 kW per kg of starting condensed lyogel, preferably between 0.5 kW and 2 kW per kg of condensed lyogel, still preferably equal to about 1 kW per kg of condensed lyogel. Said power is adjusted during the drying so that the material surface temperature is between 40° C. and 400° C., more preferably between 40° C. and 200° C., even more preferably between 50° C. and 150° C.

The mass of solvent lost during step c) or C1) is measured differently depending on the scale of the process. At the laboratory scale, this quantity is measured by weighing the lyogel obtained after step b) before and after drying under the conditions of step c) or c1). On an industrial scale, the solvent evaporated during the drying step c) or C1) is condensed in another reactor, and then weighed.

Particular Embodiment: The Nature of the Reactor

Advantageously, at least steps a), b) and c1) are implemented in at least one reactor, with a characteristic distance of said reactor between two inner walls comprising between 2 mm and 50 mm, preferably between 5 to 30 mm. This feature of reactor improves the diffusion of the reactants to the core of the composite material so that the composition of the composite material is homogeneous.

Within the context of the present invention, the term "inner wall of the reactor" is meant the wall which is in direct contact with the reactants. For example, in the case of a jacketed reactor, it is the wall of the inner shell in direct contact with the reactants. Within the context of the present invention, the term "characteristic distance between two inner walls" is meant the maximum distance between two parallel inner walls, or between the surface tangent to one of said the walls and a wall parallel to the latter, or between two surfaces tangent to the wall. For example, in the case of a cylindrical reactor, the characteristic distances between two internal walls of the reactor are the internal diameter and the internal height of the reactor. In the case of a cubic reactor, the characteristic distance between two inner walls of the reactor is the inner side of the cube. In the case of a rectangular reactor, the characteristic distances between two internal walls of the reactor are the internal height, the internal length and internal width. Preferably, the characteristic distance between two inner walls is chosen from the height, width, length, thickness and internal diameter.

Due to the particular geometry of the reactor, the distance from any point within the reactor to the inner wall of said reactor is such that the diffusion of the reactants into the lyogel is optimal. In addition, such a reactor also allows for optimized conditions of pre-drying the lyogel in step c1), if carried out in such a reactor.

Thus, steps a), b) and c1) are advantageously carried out in a first reactor, then the condensed lyogel is removed and transferred to a convective or dielectric drying reactor for step c2).

Within the context of the present invention, the term "drying" is meant as reactor for the implementation of a drying step.

Applications

The present invention also relates to the use of a composite material or of a multilayer panel according to the invention, as thermal insulation, in particular for applications in building construction or in the insulation of industrial systems or methods.

Thus, composite materials or multi-layer panels according to the invention are advantageously used for the manufacture of construction materials, including walls and partitions but also floors or ceilings or for insulating industrial piping.

The multilayer composite materials and panels according to the present invention may also be used as acoustic insulators.

The examples which follow are intended to further illustrate the present invention but are in no way limiting.

EXAMPLES

Example 1

Preparation of a Composite Panel of Thickness 10 mm According to the Invention

1) Preparation of a Silica Alcogel Composite

A silica sol obtained by hydrolyzing alkoxysilane in the presence of hydrochloric acid and then adding ammonia, was poured before gelation on a 250×290×10 mm³ sheet of melamine foam (Basotect foam marketed by BASF) in a closed chamber 300×300×70 mm³ in dimensions. After gelling, the reinforced alcogel was aged for 24 hours at 50° C. in ethanol. Hydrochloric acid and hexamethyldisiloxane (hydrophobing agent) were then introduced into the chamber to completely cover the composite alcogel. The reaction medium was heated and maintained at 50° C. for 48 h. The reaction mixture was separated from the hydrophobic silica alcogel composite by percolation.

2) Production of a Composite Material Comprising Melamine Foam and Hydrophobic Silica Aerogel The condensed alcogel reinforced by the melamine foam sheet was dried in a ventilated oven at 160° C. for 2 hours. The aerogel panel obtained is 10 mm thick and has a thermal conductivity of 12.6 mW/m-K, measured by means of guarded hot plate of NF EN 12667 at 20° C. and atmospheric pressure.

3) Measurement of Pore Diameter and Macroporosity

The composite material obtained after drying is then analyzed by 3D X-ray tomography. The acquisitions were made with DeskTom machine model equipped with a 130 kV generator. The resolution obtained on the sample is 24.5 µm, with a source/sample distance of about 12 cm. The software used for the acquisition and reconstruction of the data is a software developed by RX Solutions: X-Act. For post-processing (visualization and analysis of porosity), the software VG Studio Max Version 2.2 was used. Analysis showed the pore volume (Vm) for a vast majority of the material is between $1.10^{-4}$ mm³ and $5.10^{-3}$ mm³ (see FIG. 1).

Figure 1:
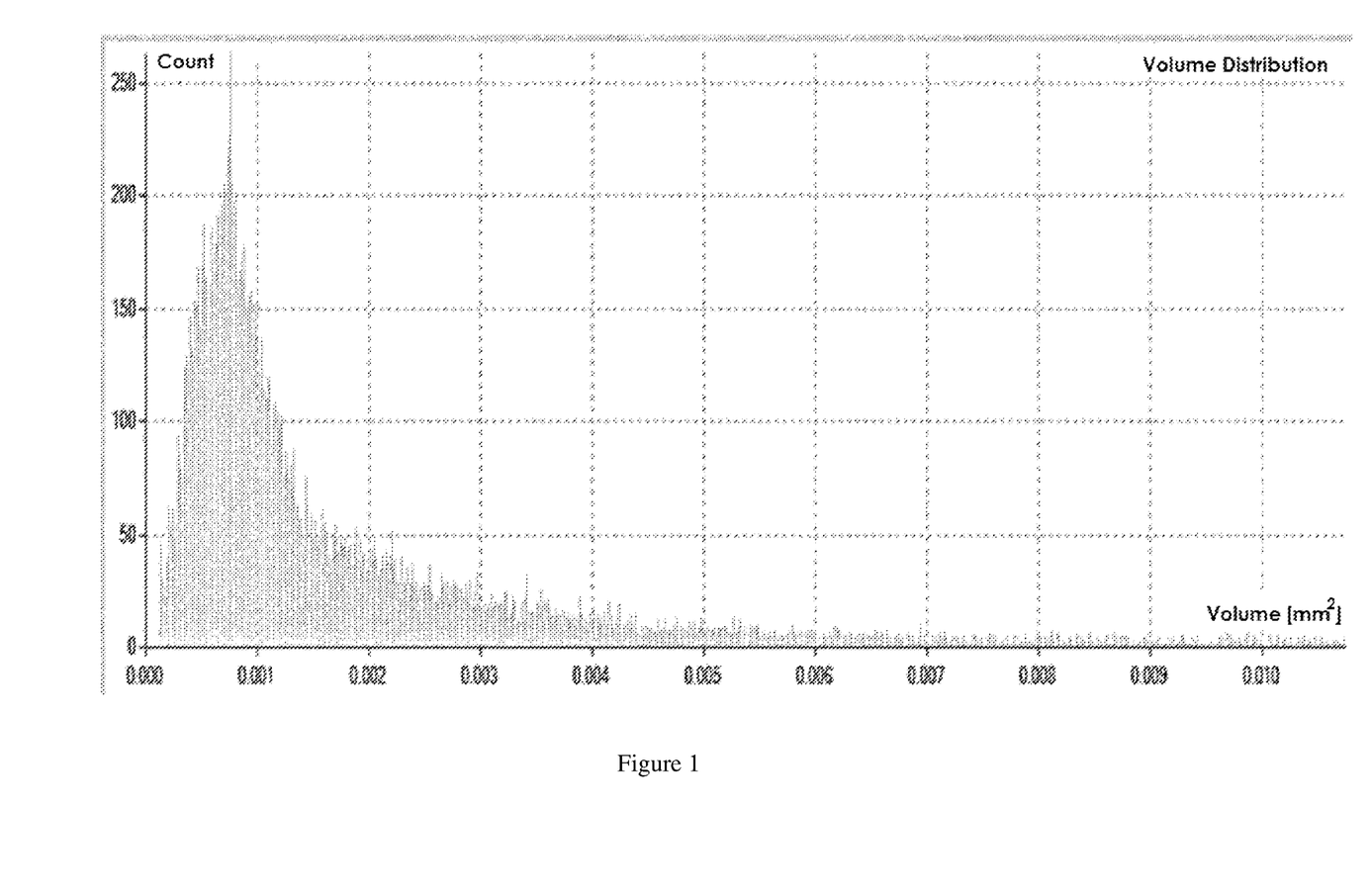
FIG. 1: Distribution of the macropore volume measured by X-ray tomography in three dimensions (3D) on the composite material obtained in Example 1. The x-axis represents the volume in mm$^3$ (on a scale of 0 to 0.01 mm$^3$) and the y-axis represents the number of macropores (on a scale from 0 to 250). The mean pore volume (Vm) for a vast majority of the material was between $1.10^{-4}$ mm$^3$ and $5.10^{-3}$ mm$^3$.

Considering that the pore shape can be likened to a perfect sphere, we apply the following mathematical formula:

$$d_{moyer} = \sqrt[3]{\left(\frac{6 \times V_{moyer}}{\pi}\right)}.$$

The diameter of the material is thus calculated as between 57 and 212 µm.

The macroporosity of the sample is calculated as the integral of the ratio of the pore volumes identified in the sample volume. According to this calculation method, the composite material has a macroporosity of 1.44%.

Example 2

Preparation of a Composite Panel of Thickness 30 mm According to the Invention

1) Preparation of a Composite of Silica Alcogel

A silica sol obtained by hydrolyzing alkoxysilane in the presence of hydrochloric acid and then adding ammonia was poured prior to gelling onto a 250×290×30 mm³ sheet of melamine foam in a closed chamber with dimensions of 300×300×70 mm³. The solvent used was ethanol. After gelation, the reinforced alcogel was aged for 24 hours under a reflux of ethanol. Hydrochloric acid and hexamethyldisiloxane (hydrophobing agent) were then introduced into the chamber to completely cover the composite alcogel. The reaction medium was heated and maintained at reflux in ethanol for 48 h. The reaction mixture was separated from the hydrophobic silica alcogel by percolation.

2) Obtaining a Melamine Foam Panel and Hydrophobic Silica Aerogel Composite

The reinforced hydrophobic silica alcogel was placed in a microwave dryer and dried for 50 min at 50° C.

The obtained aerogel panel was 30 mm thick and had a thermal conductivity of 14.2 mW/m-K, measured by means of guarded hot plate of NF EN 12667 at 20° C. and atmospheric pressure.

Example 3

Measurement of Flexibility of the Composite Material According to Example 1

Figure 2:
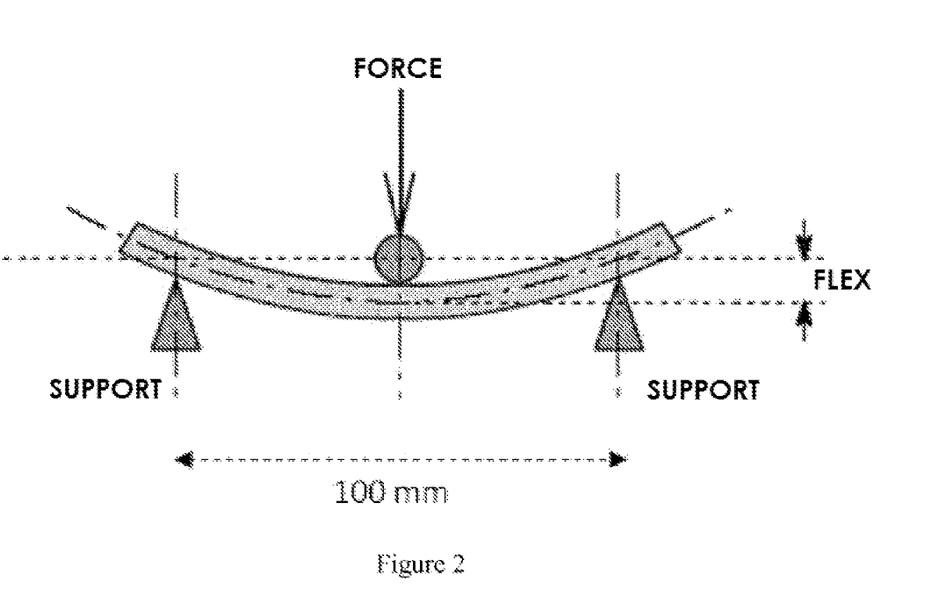
FIG. 2: A diagram showing the three-point bending device for measuring the flexibility modulus of a material. The panel is placed on two supports (represented by triangles) located at 7.5 cm from the edge, and spaced 10 cm apart, and a vertical downward force is applied by positioning the various weights (represented by a sphere in the Figure) placed at the center of the material. The distance from the center of deformation of the material is measured.

A 3-point bending test was performed as shown in FIG. 2 on a 25×10×250 mm³ sample of material manufactured according to the method presented in Example 1. The composite material is placed on two supports separated by 100 mm.

Different forces are applied to the sample at its center. The displacement (flex) thereof was measured.

Figure 3:
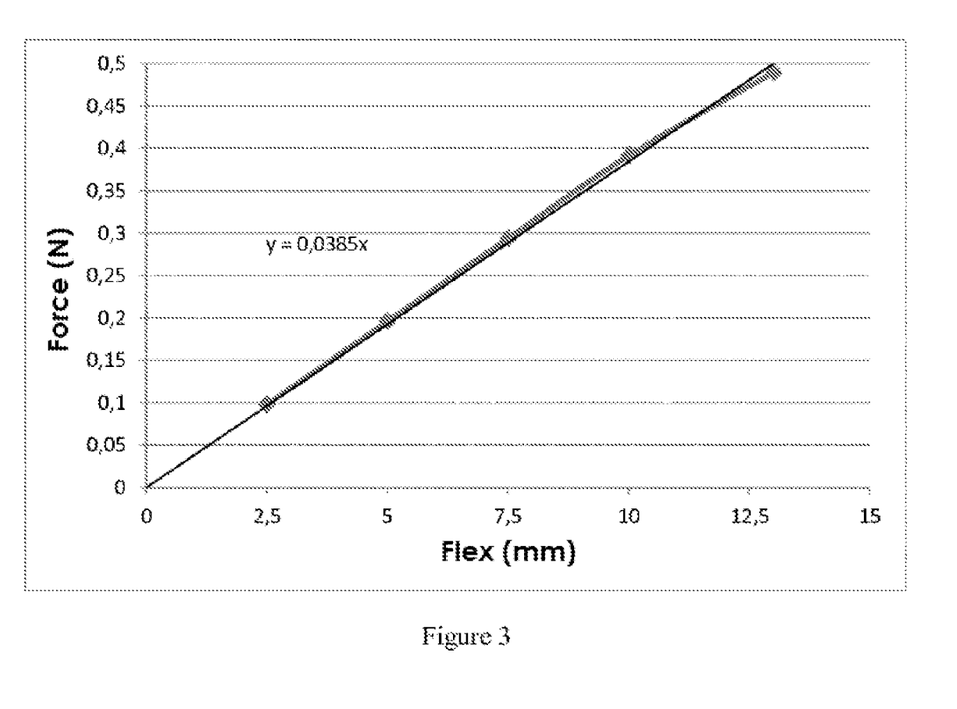
FIG. 3: Curve representing the force (measured in Newton (N), y-axis) as a function of the flex (measured in mm, x-axis). This curve represents the test results of Example 3. Linear regression is used to determine a slope of 0.0385 N/mm, and an intercept of 0.

Results:

The results obtained are shown in FIG. 3. The stiffness or flexural rigidity was calculated as K=0.0385 N/mm, which corresponds to the slope of the force-deflection curve.

Example 4

Measurement of Maximum Compression Stress of a Composite Material According to Example 1

A uniaxial compression test was performed on an electromechanical testing machine Zwick 100 kN, provided with an external force sensor capacity of 5 kN.D dimensions of the sample were 30×30×10 mm³. The moving crosshead speed is 0.3 mm/min during load and 1 mm/min during discharge.

Figure 4:
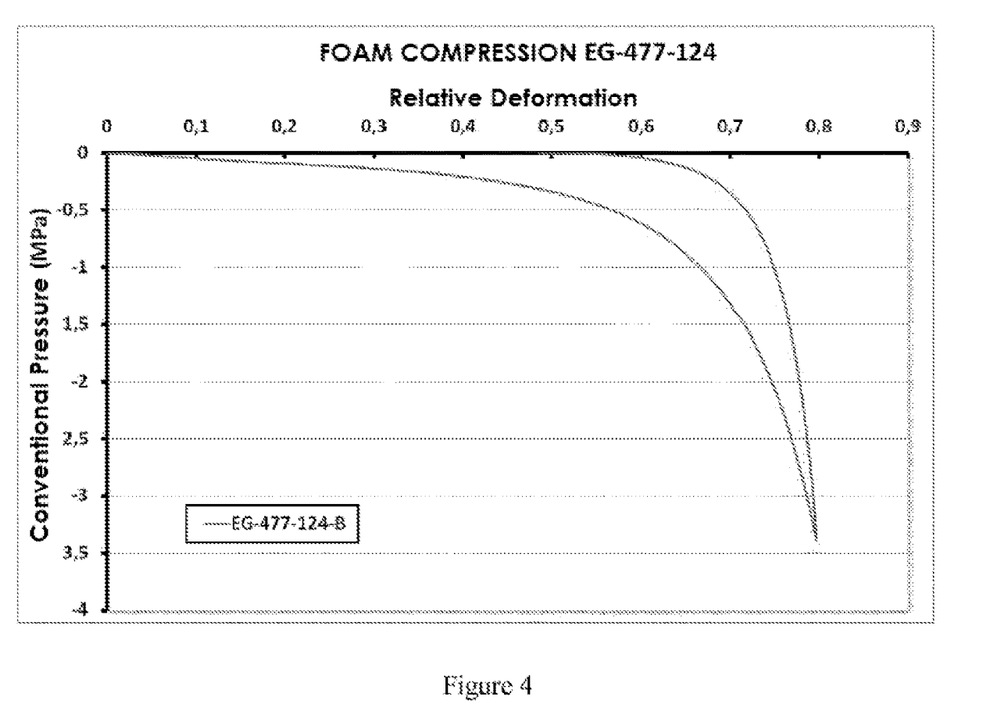
FIG. 4: Representation of the test results of Example 4. The curve obtained represents the conventional stress (expressed in MPa) as function of the relative deformation, $\varepsilon\varepsilon=(e-e_0)/e_0$, with $e_0$ as the sample thickness before the test, and $\varepsilon$ being without units.

The results of this test are shown in FIG. 4. A compression modulus of 0.43 MPa was measured, and a maximum stress of 3.3 MPa with a relative deformation of 80%.

Example 5

Preparation of a Composite Insulating Foam Panel 10 mm Thick According to the Invention 1) Preparation of a Silica Hydrogel Composite A silica sol obtained by mixing an aqueous solution of sodium silicate and hydrochloric acid solution, was poured before gelation on a 250×290×10 mm³ sheet of melamine foam in a closed chamber having dimensions of 300×300×70 mm³. After gelling, the reinforced hydrogel was aged for 24 hours at 50° C. in water. A solvent exchange was carried out with acetone (for 48 h at 50° C. by recycling acetone two times). Hydrochloric acid and hexamethyldisiloxane (hydrophobing agent) were then introduced into the chamber so as to completely cover the composite lyogel. The reaction medium was heated and maintained at 50° C. for 48 h. The reaction medium as separated from the hydrophobic silica lyogel by percolation.

2) Obtaining a Composite Panel Comprising Melamine Foam and Hydrophobic Silica Xerogel The condensed lyogel reinforced by the sheet of melamine foam was dried in a ventilated oven at 160° C. for 2 hours. The xerogel panel obtained was 9 mm thick and has a thermal conductivity of 14.5 mW/m-K, measured by means of guarded hot plate of NF EN 12667 at 20° C. and atmospheric pressure.

What is claimed is:

1. A hydrophobic composite material comprising an inorganic aerogel reinforced by a preformed open-cell melamine foam, wherein
the material has a thermal conductivity λ between 10 and 20 mW/m-K at 20° C. and atmospheric pressure, and
the inorganic aerogel has a continuous three-dimensional porous structure.

2. The composite material according to claim 1, wherein the inorganic aerogel is monolithic.

3. The composite material according to claim 1, wherein the aerogel is formed from an inorganic sol comprising between 5% and 15% by weight of inorganic material based on the total weight of the inorganic sol.

4. The composite material according to claim 1, wherein macropores whose diameter is between 50 and 250 microns comprises more than 80% of total number of macropores of said material.

5. The composite material according to claim 1, wherein the material has a thickness of between 2 and 50 mm.

6. The composite material according to claim 1, wherein the material has a density between 70 kg/m$^3$ and 150 kg/m$^3$.

7. The composite material according to claim 1, wherein the melamine foam is a melamine-formaldehyde foam having a thickness of between 2 and 50 mm, a porosity of between 95% and 99.5%, a density between 8.5 and 11.5 kg/m$^3$, and a thermal conductivity of between 35 and 40 mW/m-K measured using a guarded hot plate according to NF EN 12667 at 20° C. and atmospheric pressure.

8. The composite material according to claim 1, wherein the inorganic aerogel comprises silica, titanium oxide, manganese oxide, calcium oxide, carbonate calcium, zirconium oxide, or mixtures thereof.

9. The composite material according to claim 1, wherein the material does not contain any binder.

10. The composite material according to claim 1, wherein the material does not comprise a fibrous reinforcing material.

11. The composite material according to claim 1, wherein the material has a quantity of residual solvent by weight of the composite material of less than or equal to 3% according to EN/ISO 3251.

12. The composite material according to claim 1, wherein the aerogel further comprises an opacifier.

13. The composite material according to claim 1, wherein the percentage of a volume occupied by macropores, macropores being pores with a diameter greater than 10 μm, in a volume occupied by the material in its entirety is less than 5%, as measured using X-ray tomography and in three dimensions.

14. The composite according to according to claim 1, wherein the composite has a thermal conductivity λ between 10 and 15 mW/m-K, measured using a guarded hot plate according to NF EN 12667 at 20° C. and atmospheric pressure.

15. A multilayer panel comprising at least one layer consisting essentially of a composite material according to claim 1.

16. A thermal insulation material comprising a composite material according to claim 1.

17. An acoustic insulation material comprising a composite material according to claim 1.

* * * * *